United States Patent
Kim et al.

(12) 
(10) Patent No.: US 10,862,553 B1
(45) Date of Patent: Dec. 8, 2020

(54) USE OF RF CORRELATION BETWEEN UES IN A MU-MIMO GROUP AS A BASIS TO BIAS MCS

(71) Applicant: Sprint Spectrum L.P., Overland Park, KS (US)

(72) Inventors: Yun Sung Kim, Ashburn, VA (US); Pinal Tailor, Ashburn, VA (US); Sanghoon Sung, Ashburn, VA (US); Jason P. Sigg, Overland Park, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/510,459

(22) Filed: Jul. 12, 2019

(51) Int. Cl.
*H04B 7/0452* (2017.01)
*H04B 7/06* (2006.01)
*H04L 12/24* (2006.01)
*H04L 5/00* (2006.01)
*H04L 27/26* (2006.01)

(52) U.S. Cl.
CPC ......... *H04B 7/0452* (2013.01); *H04B 7/0632* (2013.01); *H04L 5/0005* (2013.01); *H04L 27/2601* (2013.01); *H04L 41/08* (2013.01)

(58) Field of Classification Search
None
See application file for complete search history.

(56) References Cited

U.S. PATENT DOCUMENTS

| | | | |
|---|---|---|---|
| 9,955,387 B1 | 4/2018 | Shah et al. | |
| 10,412,691 B1* | 9/2019 | Marupaduga | H04W 52/365 |
| 10,470,073 B1* | 11/2019 | Marupaduga | H04L 41/0816 |
| 10,602,478 B1* | 3/2020 | Marupaduga | H04B 7/0452 |
| 2014/0254517 A1 | 9/2014 | Nam et al. | |
| 2015/0326340 A1* | 11/2015 | Huang | H04B 7/0413 375/267 |
| 2016/0088648 A1* | 3/2016 | Xue | H04B 7/0452 370/252 |
| 2017/0257155 A1* | 9/2017 | Liang | H04B 7/15507 |
| 2018/0351605 A1* | 12/2018 | Liang | H04B 7/0417 |
| 2019/0230674 A1* | 7/2019 | Cheng | H04L 5/0007 |
| 2019/0327632 A1* | 10/2019 | Kim | H04B 7/0452 |
| 2019/0341975 A1* | 11/2019 | Yun | H04B 7/0617 |
| 2020/0044802 A1* | 2/2020 | Park | H04B 7/06 |

* cited by examiner

*Primary Examiner* — Anh Vu H Ly

(57) ABSTRACT

When a base station groups a given user equipment device (UE) together with one or more other UEs for multi-user multiple-input-multiple-output (MU-MIMO) service, the base station will predict a level of RF correlation between the given UE and the one or more other UEs of the group (e.g., based angular separation between beam direction of the UE and beam direction of each of the one or more other UEs). And the base station will use that predicted level of RF correlation as a basis to adjust a modulation and coding scheme (MCS) that the base station and the given UE will use for data communication with each other, so as to help improve data communication between the base station and the given UE in the presence of the predicted RF correlation.

20 Claims, 7 Drawing Sheets

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 2

USE OF RF CORRELATION BETWEEN UES IN A MU-MIMO GROUP AS A BASIS TO BIAS MCS

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource grant, the base station could responsively allocate particular uplink air-interface resources to carry the data, and the UE could then transmit the data to the base station on the allocated uplink resources.

OVERVIEW

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals.

Further, MIMO can also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other. In theory, MU-MIMO could thus increase the data capacity of the air interface by allowing a base station to serve more UEs at a time without requiring additional air-interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

When a base station serves many UEs at once, the base station could beneficially apply MU-MIMO in order to provide concurrent high-throughput transmissions to the UEs. For example, if the base station's air interface has 100 PRBs per timeslot and the base station has a massive-MIMO array as discussed above, then, with MU-MIMO, the base station could theoretically transmit concurrently to 8 UEs with 2 layers apiece on all 100 of those PRBs. Within one timeslot, each UE could thus theoretically receive two times the single-layer data capacity of those 100 PRBs. (By comparison, if instead of applying MU-MIMO, the base station were to apply just SU-MIMO with 2 layers apiece for each of those 8 UEs, then the base station might transmit to each UE with 2 layers on just about 12 PRBs, thus providing lower throughput.)

To facilitate MU-MIMO service, it would help for the UEs that will share air-interface resources (e.g., PRBs) to be sufficiently "orthogonal" to each other, meaning that each UE would receive spatially separate transmissions from the base station without undue interference from the base station's transmissions to each other UE. Thus, when a base station is going to apply MU-MIMO (perhaps in response to the base station being heavily loaded with connected UEs with high throughput requirements), the base station could select a group of UEs to be a MU-MIMO group based on the UEs being sufficiently orthogonal to each other. The base station could deem the UEs of a group to be sufficiently orthogonal to each other if each UE has reported threshold high signal-to-noise-plus-interference ratio (SINR), and/or if the UEs are located at positions that are physically separate enough from each other that the base station's RF transmission paths to the UEs would have sufficient angular separation, among other possibilities.

Unfortunately, however, even if the base station strives to group UEs for MU-MIMO service based on the UEs of the group being sufficiently orthogonal to each other, there may still be some level of interference between transmissions to the UEs of the group. For instance, UEs of the group may still be located physically close enough together and/or may otherwise be positioned such that the base station's RF transmission to one UE of the group may be received at least partially by another UE of the group. Such interference could make it difficult for the individual UEs of the group to properly demodulate transmissions intended for them, which could lead to communication errors, retransmissions, and other issues.

Disclosed herein is a mechanism to help address this issue.

In accordance with the disclosure, when a base station groups a given UE together with one or more other UEs for MU-MIMO service, the base station will predict a level of RF correlation between the given UE and the one or more other UEs of the group (e.g., based angular separation between beam direction of the UE and beam direction of each of the one or more other UEs). And the base station will use that predicted level of RF correlation as a basis to adjust a modulation and coding scheme (MCS) that the base station and the given UE will use for data communication with each other, so as to help improve data communication between the base station and the given UE in the presence of the predicted RF correlation.

For instance, the base station may normally apply a standard mapping between channel qualities and MCSs in order to determine, based on a channel quality reported by the UE, what MCS should be used for data communication between the base station and the UE. Per the present disclosure, however, if the base station predicts that the UE will have relatively high RF correlation with one or more other UEs of the UE's MU-MIMO group, then the base station could respond by artificially reducing that determined MCS to a lower-order MCS, such as an MCS that uses more error-correction coding and/or a more robust modulation scheme. Optimally, use of the lower-order MCS may thus allow for more successful data communication between the base station and the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate aspects by way of example only and not by way of limitation.

BRIEF DESCRIPTION OF THE DRAWINGS

FIG. 2 is an example of a table mapping CQI to MCS.

DETAILED DESCRIPTION

Figure 1:
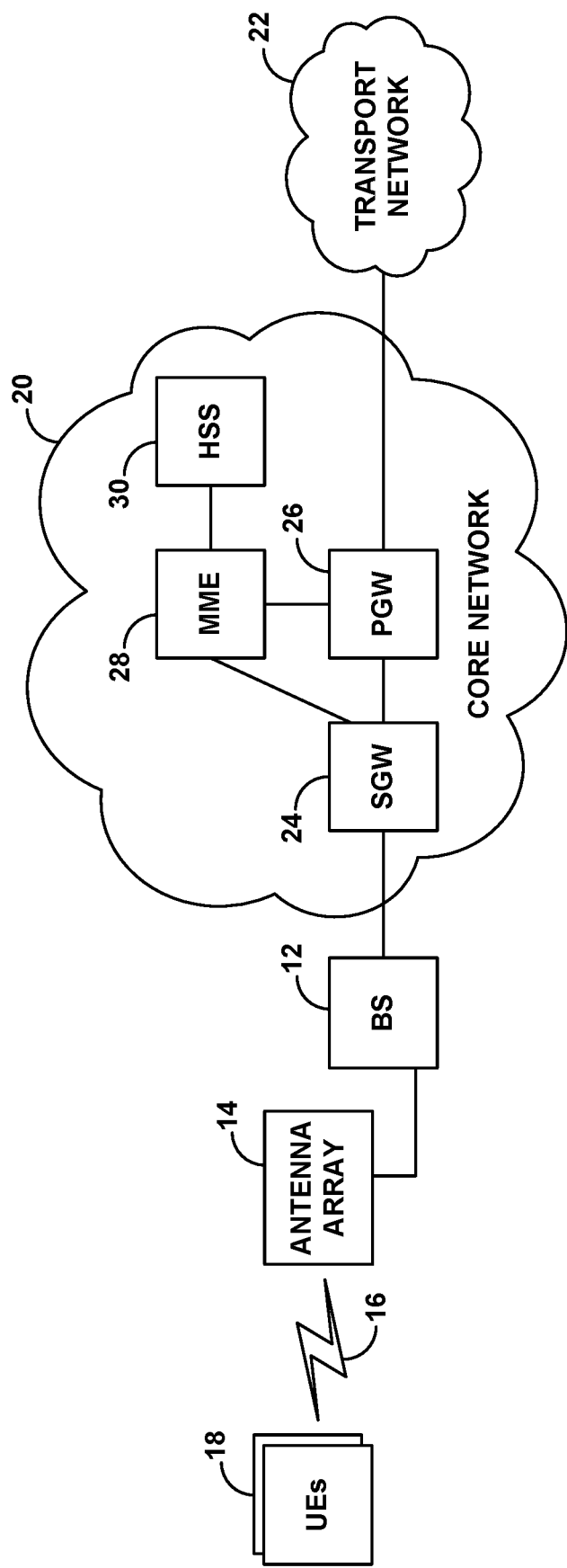
FIG. 1 is a simplified block diagram of a wireless communication system in which embodiments of the disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage 16 on one or more carriers in one or more frequency bands. Shown operating within coverage of the base station are then a plurality of UEs 18, which could be devices of the type discussed above, among other possibilities. Although the UEs are shown one on top of the other in the figure, they may be positioned at various locations within coverage 16, some close to each other and some far apart from each other.

The base station 12 could be a macro base station of the type configured to provide a wide range of coverage, and the antenna array 14 could be mounted on a tower or other tall structure. Alternatively, the base station could take other forms, such as a small cell base station, a repeater, a femtocell base station, or the like, which might be configured to provide a smaller range of coverage, still including or otherwise in communication with the antenna array. The base station could be configured to operate according to a 4G, 5G, or other radio access technology. For instance, the base station could be an LTE evolved Node-B (eNB) or a 5G NR next-generation Node-B (gNB), among other possibilities.

The base station is shown coupled with a core network 20, which could be an evolved packet core (EPC) network, next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. The base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. The MME then operates as a controller to carry out operations such as coordinating UE attachment and setup of user-plane bearers, paging of UEs, and tracking UE service location. And the HSS includes or has access to a data store containing UE capabilities and service profile data, to facilitate UE authentication and service configuration.

As noted above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements.

Further, particular groupings of resource elements on the air interface could be grouped together to define the PRBs discussed above. For instance, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as to carry uplink reference signals or the like. In operation, when a UE enters into coverage of the base station on a carrier, the UE could detect the base station's synchronization signal on that carrier and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE a user-plane access bearer between the base station and the PGW, and the base station could set up a corresponding data radio bearer between the base station and the UE, to enable the UE to engage in communication on the transport network. Further, the base station could establish for the UE a context record indicating operational state of the UE, and the base station could receive from the UE and/or the HSS (via the MME) a set of capabilities and profile data for the UE and could store that data in the context record for reference while serving the UE.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the base station a positive acknowledgement (ACK) control message, and the base station could then proceed with transmission of a next transport block (if any) to the UE. Whereas, if the UE did not receive the transmission or determined that the CRC did not match and thus that there was an error in the received transport block, then the UE could transmit to the base station a negative acknowledgement (NACK), in response to which the base station could attempt the transmission again.

Further, when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

As with downlink transmission, for each transport block that the UE transmits to the base station, the base station could determine if the transport block arrived successfully, based on a CRC analysis for instance. And if the base station received the transmission successfully, then the base station could transmit to the UE an ACK and could schedule a next uplink transmission from the UE. Whereas, if the base station did not receive the transmission successfully, then the base station could transmit to the UE a NACK, and the UE could attempt retransmission to the base station.

As noted above, when the base station serves a UE, the base station could normally map the UE's channel quality to an MCS that is to be used for communication between the base station and the UE.

To facilitate this, the UE could regularly evaluate the quality of its air interface communication channel with the base station, which could be based on the UE's measurement of reference-signal receive quality (e.g., SINR) and UE capabilities (e.g., antenna and/or radio configuration), and the UE could periodically transmit to the base station a channel-quality-indicator (CQI) value that represents the UE's determined level of channel quality. When the base station is going to allocate one or more PRBs for use to carry data to or from the UE, the base station could then map the UE's most recent reported CQI to an applicable MCS to be used for communication of data in those PRBs. And the base station could specify this MCS in the DCI message that the base station sends to the UE, to inform the UE what MCS will be used for the scheduled data communication The MCS thus selected by the base station based on the UE's CQI could define a coding rate and a modulation scheme for use in communicating data between the base station and the UE. The coding rate could define a rate of usable data communication, taking into account any error-correction coding added to help overcome errors in transmission (with more added error correction coding corresponding with a lower effective data rate). And the modulation scheme could define how data will be modulated for transmission over the air, including how many bits of a coded data stream (including any added error-correction bits) can be modulated on the subcarrier of each air-interface resource element. Examples of modulation schemes include, without limitation, (i) Quadrature Phase Shift Keying (QPSK), which represents 2 bits per resource element, (ii) 8PSK, which represents 3 bits per resource element, (iii) 16 Quadrature Amplitude Modulation (16QAM), which represents 4 bits per resource element, and (iv) 64QAM, which represents 6 bits per resource element.

In general, a lower-order MCS, using a lower coding rate (e.g., with more error-correction data) and/or a modulation scheme in which each air-interface resource element represents fewer bits, may be more robust and error-tolerant and thus more suitable when the UE's channel conditions are poor. Whereas, a higher-order MCS, using a higher coding rate (e.g., with less error-correction data) and/or a modulation scheme in which each air-interface resource element represent a greater number of bits, may be less robust but may provide higher throughput and may thus be more suitable when the UE's channel conditions are good.

In practice, the base station could maintain or otherwise have access to a table that maps CQI values with MCSs, ranging from a lowest CQI value correlated with a lowest-order MCS to a highest CQI value correlated with a highest-order MCS. FIG. 2 depicts a standard example of such a CQI-MCS table, showing CQI indexes ranging from 1 up to 15 and MCSs correspondingly ranging from QPSK with a coding rate of 78/1024 up to a 64QAM with a coding rate of 948/1024. In this table, each MCS is thus a combination of modulation type (e.g., ranging from a lowest-order modulation scheme of QPSK to a highest order modulation scheme of 64-QAM) and coding rate (e.g., ranging from 78/1024 to 948/1024), though in other examples the MCS could simply be the modulation type or could take still other forms.

Applying this table, the base station could select an MCS to be used for a next scheduled communication with a UE, with the selection being based on the latest CQI (or CQIs) that the base station received from the UE. For example, if the latest CQI that the base station received from the UE was CQI 5, then the base station could determine that the MCS should be QPSK at a coding rate of 602/1024, so the base station could specify this MCS in the DCI message that the base station sends to the UE, and communication could proceed accordingly. Whereas if the latest CQI that the base station received from the UE was CQI 9, then the base station could determine that the MCS should be 16-QAM at a coding rate of 616/1024, so the base station could thus specify this MCS in the DCI message that the base station sends to the UE, and communication could proceed accordingly.

In practice, the base station may serve multiple connected UEs at a time, and the base station may face a need to schedule data transmissions concurrently to multiple such UEs and/or from multiple such UEs. Because the base station's air interface has just a finite, limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to separately meet the throughput needs of each of the UEs.

As noted above, the base station could use MIMO to help overcome this problem. In particular, the base station could apply MU-MIMO to facilitate serving multiple UEs at once on the same PRBs as each other, providing each of the multiple UEs with a desired level of throughput while also achieving improved spectral efficiency. As further noted above, one way to provide such MIMO service is with use of a massive-MIMO antenna array. Thus, in an example implementation, the base station's antenna array 14 could be a massive-MIMO array. Alternatively, the base station could use another form of antenna array or other antenna structure.

Figure 3:
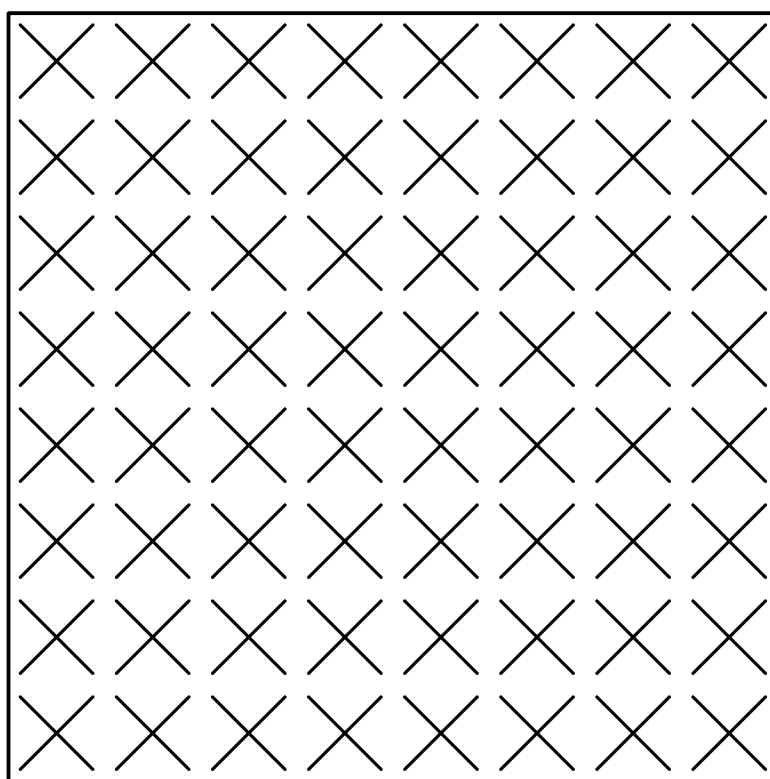
FIG. 3 is a simplified diagram of an example massive-MIMO antenna array that could be implemented according to the disclosure.

Without limitation, FIG. 3 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As noted, the base station could transmit individual MIMO layers to UEs, by beamforming and/or pre-coding the transmissions. For example, the base station could beamform transmissions to an individual UE by evaluating angle of arrival (AoA) of uplink signals (e.g., an uplink sounding-reference-signal) from the UE or determining geo-location of the UE, and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

The base station could thus transmit to the UEs of the group on the same PRBs as each other, i.e., at the same time and on the same subcarriers as each other. The transmissions to the UEs would occupy the same PRBs as each other. But assuming sufficient orthogonality between UEs of a group, the transmissions would be separated from each other through beamforming, pre-coding, and/or one or more other mechanisms.

Therefore, in each downlink subframe, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

In this manner, the base station could thus theoretically allocate all of the PRBs of a subframe to the MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to those UEs with MIMO layers on those PRBs, and the base station might allocate other PRBs of the subframe to a second MU-MIMO group of UEs and transmit to those UEs with MIMO layers on those PRBs. Further, the base station might allocate some PRBs of the subframe for use without MIMO or in other ways.

To configure MU-MIMO service for a UE, the base station may engage in signaling with the UE to obtain channel estimates and precoding information, and the base station may work with the UE through DCI signaling to prepare the UE for receipt of beamformed and pre-coded transmissions or the like.

As further noted above, even if a base station has determined that a group of UEs are sufficiently orthogonal to each other to support MU-MIMO service, there is still a risk of some interference between transmissions to the UEs of the MU-MIMO group. In particular, UEs of an established MU-MIMO group could be physically positioned at locations such that a given one of the UEs experiences interference from the base station's transmissions on the same PRB(s) to one or more other UEs of the group.

As indicated above, the base station can help address this situation by predicting a level of RF correlation between the given UE and the one or more other UEs of the MU-MIMO group and by using that predicted level of RF correlation as a basis to artificially adjust the MCS order that will be used for data communication between the base station and the given UE.

In an example implementation, the base station could predict the level of RF correlation for the given UE based on comparison of beam directions that the base station is set to use for the various UEs of the MU-MIMO group (e.g., based on a comparison of AoA between the UEs of the group). For each UE of the group, as noted above, the base station could establish a beam direction respectively for beamformed transmission to the UE. This beam direction could include a horizontal angle in relation to a horizontal reference angle and a vertical or elevation angle measured in relation to a vertical reference angle.

The base station's MIMO array may facilitate beamformed transmission with a particular level of granularity, or beam focus, depending on the number of antenna elements in the array. A massive-MIMO array with a greater number of antenna elements may support transmission on a greater number of narrow, focused beams within the base station's coverage. Whereas, a MIMO array with fewer antenna elements may support transmission on a fewer number of less focused beams within the base station's coverage.

Figure 4:
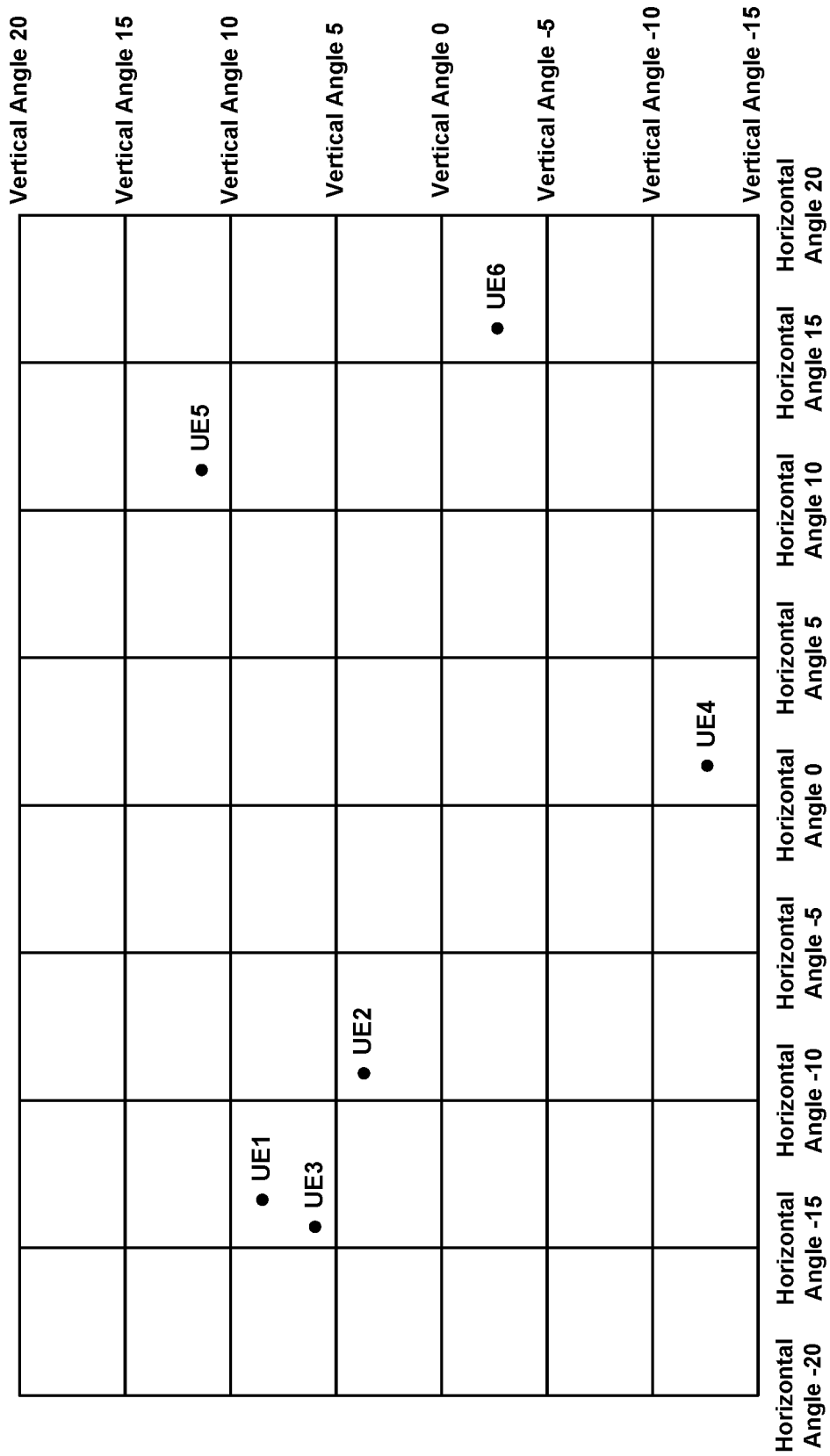
FIG. 4 is an example grid that plots ranges of vertical beam angles against ranges of horizontal beam angles, for use in an example implementation according to the present disclosure.

For a given MIMO array, these beam directions could be represented conceptually as a grid plotting vertical angle versus horizontal angle. FIG. 4 is an example of such a grid for an example massive-MIMO array. This example grid is divided horizontally into 5-degree horizontal beam-direction segments ranging from −20° to +20° and is likewise divided vertically into 5-degree vertical beam-direction segments ranging from −15° to +20°, thus including 56 grid bins each representing a respective beam direction useable by the base station.

Although these bins represent specific beam directions, a beam in one bin may overlap to some extent with beams in other bins, with the extent of overlap being greater for bins that are closer to each other in the grid. Further, multiple beams in a given bin are even more likely to overlap with each other.

Accordingly, to facilitate evaluation of RF correlation between UEs of a MU-MIMO group, the base station could categorize the UEs of the group to individual bins of the grid according to the beam directions that the base station is set to use for the respective UEs. And the base station could compute a level of RF correlation for a given $UE_k$ of the group based on a comparison of distance in the grid between the bin in which that $UE_k$ is categorized and the bin(s) in which the other UEs(s) the MU-MIMO group are categorized. The base station could use any algorithmic process here. For instance, as to each of the other i UEs of the group, the base station could assign a score based on how close the other UE's bin is to the bin of $UE_k$ (with the highest score being for another UE categorized in the same bin as $UE_k$), and the base station could sum the scores computed as to the i other UEs of the group to produce a cumulative RF-correlation value for $UE_k$. Other examples are possible as well.

Upon computing this predicted RF correlation value for $UE_k$, the base station could then use the predicted RF correlation value as a basis to determine whether, and if so how much, to adjust the MCS order that will be used for communication between the base station and the UE.

To facilitate this, the base station could be equipped with mapping data that correlates various RF correlation values with respective extents of MCS adjustment. For instance, the mapping data could specify one or more threshold levels of RF correlation and could indicate respectively for each threshold level how many rows of adjustment in the table of FIG. 2 the base station should apply to reduce the UE's MCS order from that corresponding with the UE's reported CQI.

By way of example, if the UE's reported CQI is 8, the table of FIG. 2 would normally map that CQI to an MCS of 16QAM with a code rate of 490/1024. But the mapping data may specify that if the predicted RF correlation value for the UE is at least a particular predefined threshold level, the base station should artificially lower the UE's MCS up one row in the table to be 16QAM with a code rate of 378/1024. And the mapping data may specify that if the predicted RF correlation value for the UE is, rather, at least a higher predefined threshold level, the base station should artificially lower the UE's MCS up two rows in the table to be QPSK with a code rate of 602/1024, and so forth.

Once the base station has so determined the adjusted MCS for the UE based on predicted RF correlation between the UE and one or more other UEs of the UE's MU-MIMO group, the base station could then schedule air interface communication with the UE to use the adjusted MCS rather than the MCS that correlates with the UE's reported CQI. For instance, the base station could transmit to the UE a DCI message that schedules downlink transmission to the UE on the same PRB(s) as the base station will be transmitting to the other UEs of the MU-MIMO group but that specifies use of the adjusted MCS rather than the MCS that correlates with the UE's reported CQI. And the base station could according engage in that transmission to the UE using that adjusted MCS.

As noted above, by so reducing the MCS order based on the UE's predicted RF correlation, the base station may help to facilitate more successful data communication between the base station and UE, perhaps helping to avoid or minimize the need for retransmissions and associated issues.

Figure 5:
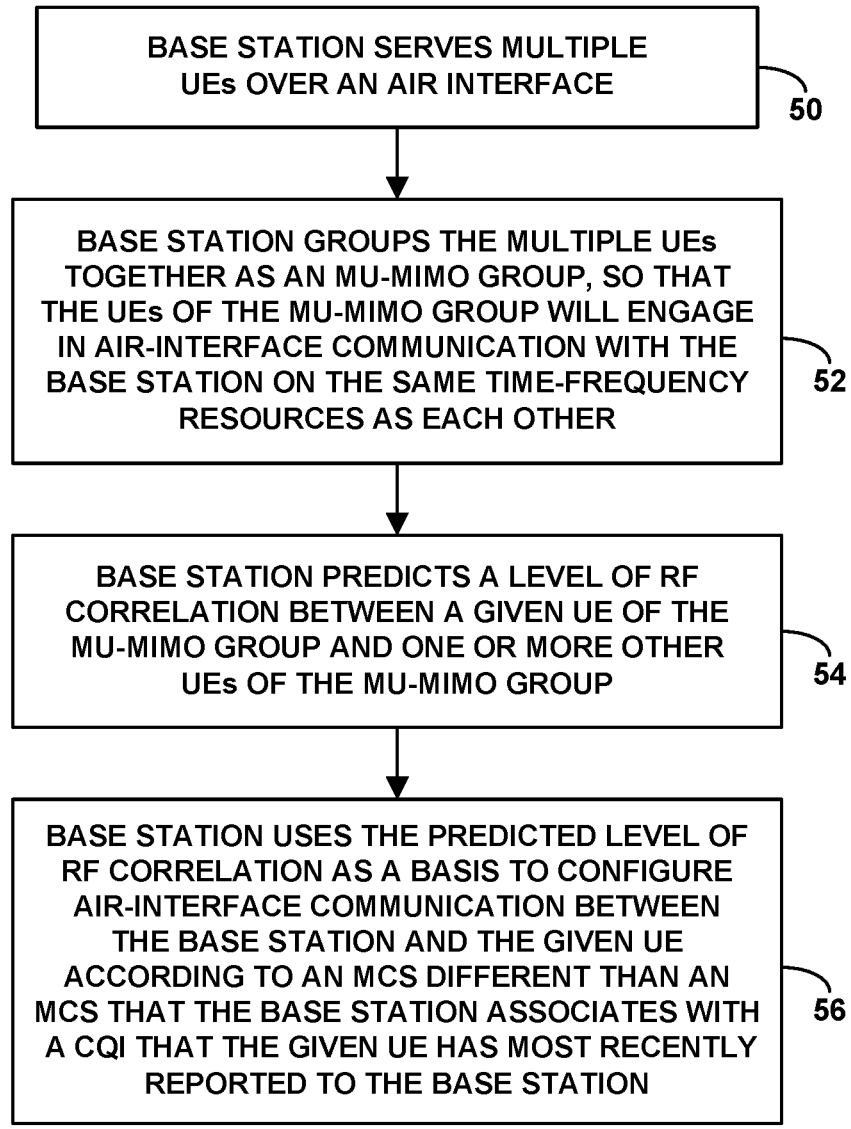
FIG. 5 is a flow chart depicting functions that can be carried out in accordance with the present disclosure.

FIG. 5 is a flow chart depicting a method that can be carried out in accordance with this disclosure, to control transmission over an air interface in a wireless communication system, the air interface defining time-frequency resources such as PRBs for instance.

As shown in FIG. 5, at block 50, the method includes the base station serving multiple UEs over the air interface. And at block 52, the method includes the base station grouping the multiple UEs together as an MU-MIMO group, so that the UEs of the MU-MIMO group will engage in air-interface communication with the base station on the same time-frequency resources as each other. At block 54, the method further includes the base station predicting a level of RF correlation between a given UE of the MU-MIMO group and one or more other UEs of the MU-MIMO group. And at block 56, the method includes the base station using the predicted level of RF correlation as a basis to configure air-interface communication between the base station and the given UE according to an MCS different than an MCS that the base station associates with a CQI that the given UE has most recently reported to the base station.

In line with the discussion above, the act of grouping the multiple UEs together as the MU-MIMO group could be based on determining that the UEs are orthogonal to each other, such as that the beam directions for communication between the base station and the various UEs have at least a predefined threshold extent of angular separation.

Further, as discussed above, the act of predicting the level of RF correlation between the given UE of the MU-MIMO group and the one or more other UEs of the MU-MIMO group could involve computing the level of RF correlation based on angular separation between (i) beam direction for communication between the base station and the given UE of the MU-MIMO group and (ii) respective beam direction for communication between the base station and each of the one or more other UEs of the MU-MIMO group.

In practice, for instance, the method could additionally include determining respectively for each UE of the MU-MIMO group a beam direction for communication between the base station and the UE. And the act of computing the level of RF correlation between the given UE and the one or more other UEs could involve evaluating angular separation between (i) the determined beam direction for communication between the base station and the given UE and (ii) the determined beam direction respectively for communication between the base station and each of the one or more other UEs.

Further, as discussed above, the act of predicting the level of RF correlation between the given UE of the MU-MIMO group and the one or more other UEs of the MU-MIMO group could involve a grid analysis. For instance, the analysis could involve a grid that plots ranges of vertical beam angles against ranges of horizontal beam angles, such as that shown in FIG. 4. With such a grid, the analysis could involve categorizing each UE of the MU-MIMO group into a respective grid location (e.g., a grid bin) and evaluating distance in the grid between the respective grid location of the given UE and the respective grid location of each of the other UEs of the MU-MIMO group, possibly computing a cumulative RF-correlation score as noted above.

In an example implementation, the method could further involve the base station maintaining a table that associates CQIs with MCSs, ranging from a lowest CQI associated with a lowest-order MCS to a highest CQI associated with a highest-order MCS. And the act of using the predicted level of RF correlation as a basis to configure air-interface communication between the base station and the given UE according to the MCS different than the MCS that the base station associates with a CQI that the given UE has most recently reported to the base station could involve (i) determining from the table a baseline MCS that the table correlates with the CQI that the given UE has most recently reported to the base station, (ii) determining that the predicted level of RF correlation is at least as high as a predefined threshold level, (iii) responsive to the determining that the predicted level of RF correlation is at least as high as the predefined threshold level, selecting from the table the different MCS based on the selected MCS being lower-order than the baseline MCS, and (iv) configuring the air-interface communication between the base station and given UE to use the selected MCS rather than the baseline MCS.

In addition, as discussed above, the act of configuring the air-interface communication between the base station and given UE to use the selected MCS rather than the baseline MCS could involve transmitting to the UE a scheduling directive that schedules the air-interface communication and that specifies use of the selected MCS rather than use of the baseline MCS. For instance, the air-interface communication could be downlink communication, and the scheduling directive could schedule the downlink communication.

Still further, the method could include the base station maintaining a mapping between various levels of RF correlation and various respective MCS adjustments, such as a mapping that indicates respectively for each level of RF correlation a corresponding respective MCS adjustment. In that case, using the predicted level of RF correlation as a basis to configure air-interface communication between the base station and the given UE according to the MCS different than the MCS that the base station associates with the CQI that the given UE has most recently reported to the base station could involve (i) using the mapping to determine based on the predicted level of RF correlation a respective MCS adjustment, (ii) establishing the different MCS by applying the determined MCS adjustment to the MCS that the base station associates with the CQI the given UE has most recently reported to the base station, and (iii) configuring the air-interface communication between the base station and the given UE according to the established different MCS.

Figure 6:
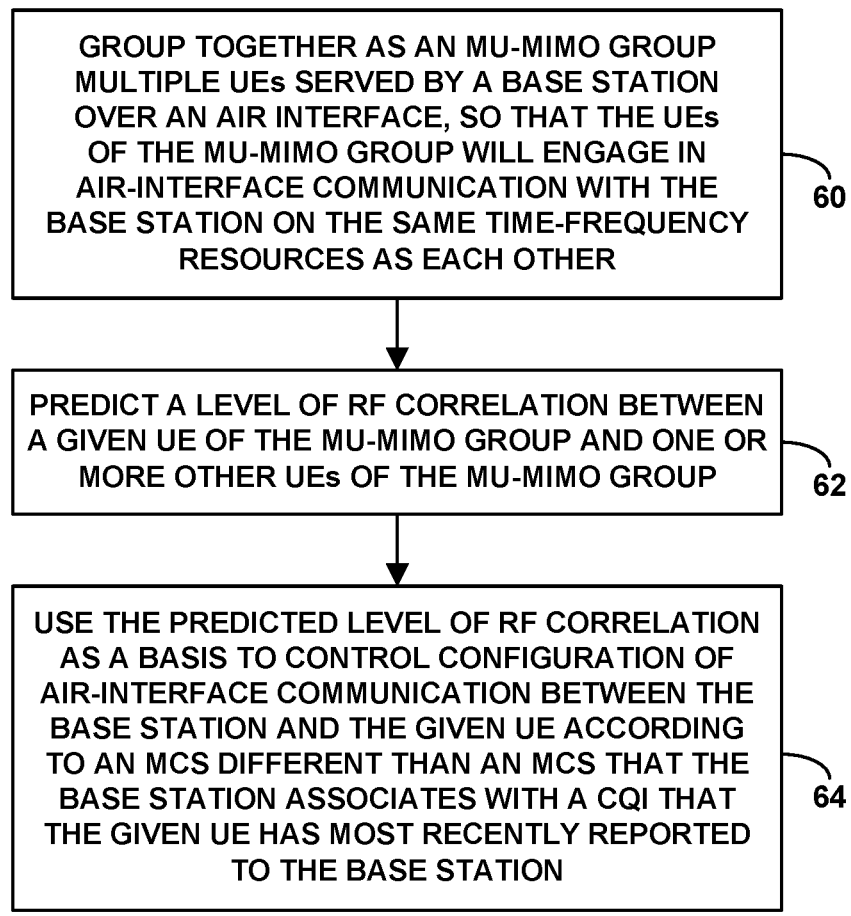
FIG. 6 is another flow chart depicting functions that can be carried out in accordance with the present disclosure.

FIG. 6 is next another flow chart illustrating that similar operations could be carried out by one or more other entities, to help control transmission over an air interface in a wireless communication system, the air interface defining various time-frequency resources. For instance, in a network that includes an element management system (EMS) or other system that could control base station operation or the like, such a system could implement this method, alone or in combination with the base station and/or one or more other entities.

As shown in FIG. 6, at block 60, the method includes grouping together as an MU-MIMO group multiple UEs served by a base station over the air interface, so that the UEs of the MU-MIMO group will engage in air-interface communication with the base station on the same time-frequency resources as each other. Further, at block 62, the method includes predicting a level of RF correlation between a given UE of the MU-MIMO group and one or more other UEs of the MU-MIMO group. And at block 64, the method includes using the predicted level of RF correlation as a basis to control configuration of air-interface communication between the base station and the given UE according to an MCS different than an MCS that the base station associates with a CQI that the given UE has most recently reported to the base station.

Various other features discussed above can be applied in this context, and vice versa.

Figure 7:
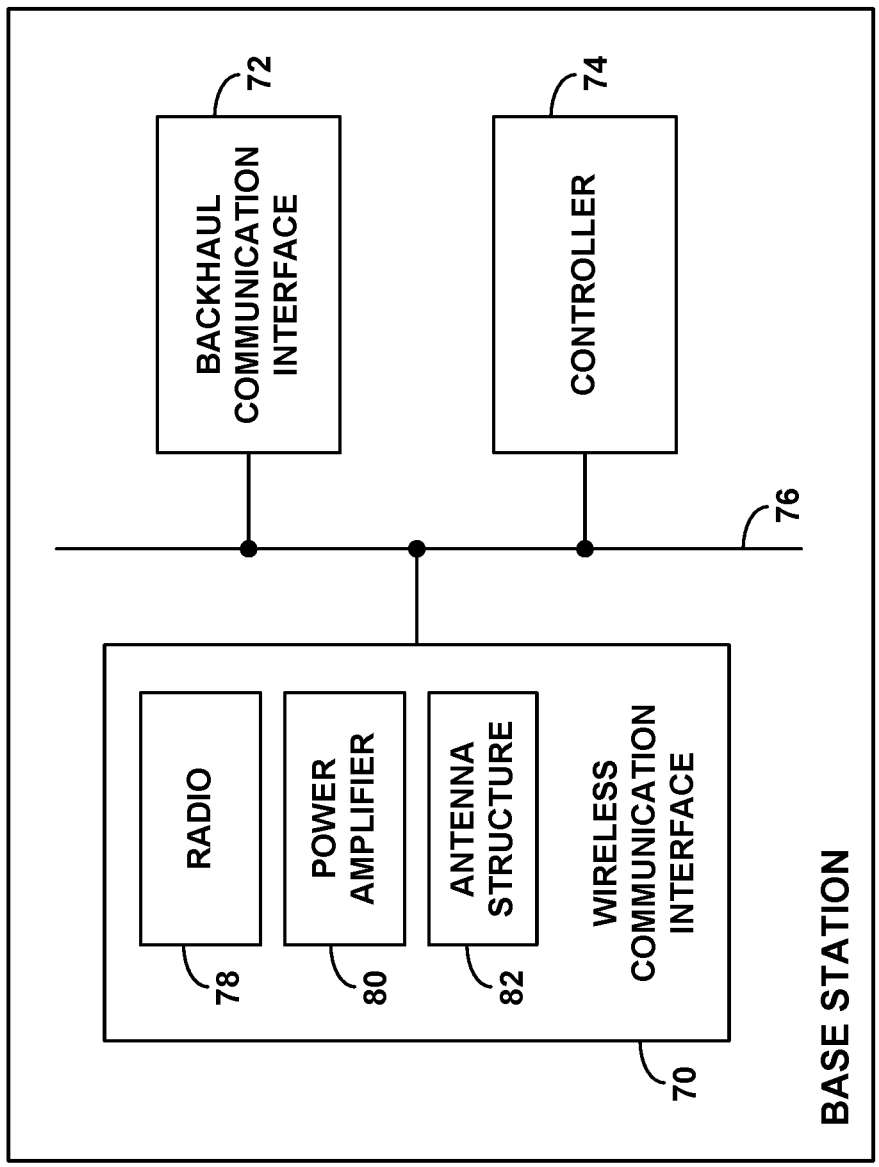
FIG. 7 is a simplified block diagram of an example base station operable to carry out a method in accordance with the disclosure.

Finally, FIG. 7 is a simplified block diagram of an example base station that could operate in accordance with the present disclosure, to control transmission over an air interface in a wireless communication system.

As shown in FIG. 7, the example base station includes a wireless communication interface 70, a backhaul communication interface 72, and a controller 74, which could be integrated together and/or communicatively linked by a network, system bus, or other connection mechanism 76.

Wireless communication interface 70 includes a radio 78, a power amplifier 80, and antenna structure 82. The radio could operate to interface between encoded baseband signals and RF signals. The power amplifier could operate to amplify signals for transmission by the antenna structure 82. And the antenna structure 82 could comprise a plurality of antennas for communicating over the air interface, where the air interface defines physical channel resources for carrying data wirelessly from the base station to a plurality of UEs served by the base station. As discussed above, the antenna structure could comprise an antenna array, such as a massive-MIMO array for instance.

Backhaul communication interface 72 could be a network communication interface (e.g., an Ethernet network interface port and/or connection) through which the base station can communicate with various other network entities.

And controller 74, which could comprise one or more processing units, non-transitory data storage, and program instructions stored in the data storage and executable by the processing unit(s), or could take other forms, could be operable to cause the base station to carry out various operations as described herein.

Various features described above could be applied in this context as well, and vice versa.

Exemplary embodiments have been described above. Those skilled in the art will understand, however, that changes and modifications may be made to these embodiments without departing from the true scope and spirit of the invention.

We claim:

1. A method for controlling transmission over an air interface in a wireless communication system, wherein the air interface defines various time-frequency resources, the method comprising:
   serving, by a base station, a plurality of user equipment devices (UEs) over the air interface;
   grouping, by the base station, the plurality of UEs together as a multi-user multiple-input-multiple-output (MU-MIMO) group, wherein the UEs of the MU-MIMO group will engage in air-interface communication with the base station on the same time-frequency resources as each other;
   predicting, by the base station, a level of radio-frequency (RF) correlation between a given UE of the MU-MIMO group and one or more other UEs of the MU-MIMO group; and
   using, by the base station, the predicted level of RF correlation as a basis to configure air-interface communication between the base station and the given UE according to a modulation and coding scheme (MCS) different than an MCS that the base station associates with a channel quality index (CQI) that the given UE has most recently reported to the base station.

2. The method of claim 1, wherein grouping the plurality of UEs together as the MU-MIMO group is based on determining that the UEs are orthogonal to each other.

3. The method of claim 1, wherein predicting the level of RF correlation between the given UE of the MU-MIMO group and the one or more other UEs of the MU-MIMO group comprises:
   computing the level of RF correlation based on angular separation between (i) beam direction for communication between the base station and the given UE of the MU-MIMO group and (ii) respective beam direction for communication between the base station and each of the one or more other UEs of the MU-MIMO group.

4. The method of claim 3, further comprising determining respectively for each UE of the MU-MIMO group a beam direction for communication between the base station and the UE,
   wherein computing the level of RF correlation between the given UE and the one or more other UEs comprises evaluating angular separation between (i) the determined beam direction for communication between the base station and the given UE and (ii) the determined beam direction respectively for communication between the base station and each of the one or more other UEs.

5. The method of claim 1, wherein predicting the level of RF correlation between the given UE of the MU-MIMO group and the one or more other UEs of the MU-MIMO group comprises:
   in a grid that plots ranges of vertical beam angles against ranges of horizontal beam angles, categorizing each UE of the MU-MIMO group into a respective grid location; and
   evaluating distance in the grid between the respective grid location of the given UE and the respective grid location of each of the other UEs of the MU-MIMO group.

6. The method of claim 1, further comprising
   maintaining by the base station a table that associates CQIs with MCSs, ranging from a lowest CQI associated with a lowest-order MCS to a highest CQI associated with a highest-order MCS,
   wherein using the predicted level of RF correlation as a basis to configure air-interface communication between the base station and the given UE according to the MCS different than the MCS that the base station associates with the CQI that the given UE has most recently reported to the base station comprises:
   determining from the table a baseline MCS that the table correlates with the CQI that the given UE has most recently reported to the base station,
   determining that the predicted level of RF correlation is at least as high as a predefined threshold level,
   responsive to the determining that the predicted level of RF correlation is at least as high as the predefined threshold level, selecting from the table the different MCS based on the selected MCS being lower-order than the baseline MCS, and
   configuring the air-interface communication between the base station and given UE to use the selected MCS rather than the baseline MCS.

7. The method of claim 6, wherein configuring the air-interface communication between the base station and given UE to use the selected MCS rather than the baseline MCS comprises transmitting to the UE a scheduling directive that schedules the air-interface communication and that specifies use of the selected MCS rather than use of the baseline MCS.

8. The method of claim 7, wherein the air-interface communication is downlink communication.

9. The method of claim 1, further comprising:
   maintaining by the base station a mapping between various levels of RF correlation and various respective MCS adjustments,
   wherein using the predicted level of RF correlation as a basis to configure air-interface communication between the base station and the given UE according to the MCS different than the MCS that the base station associates with the CQI that the given UE has most recently reported to the base station comprises:
   using the mapping to determine based on the predicted level of RF correlation a respective MCS adjustment, and
   establishing the different MCS by applying the determined MCS adjustment to the MCS that the base station associates with the CQI the given UE has most recently reported to the base station, and
   configuring the air-interface communication between the base station and the given UE according to the established different MCS.

10. The method of claim 1, wherein the time-frequency resources are physical resource blocks.

11. A method for controlling transmission over an air interface in a wireless communication system, wherein the air interface defines various time-frequency resources, the method comprising:
   grouping together as a multi-user multiple-input-multiple-output (MU-MIMO) group a plurality of user equipment devices (UEs) served by a base station over the air interface, wherein the UEs of the MU-MIMO group will engage in air-interface communication with the base station on the same time-frequency resources as each other;
   predicting a level of radio-frequency (RF) correlation between a given UE of the MU-MIMO group and one or more other UEs of the MU-MIMO group; and using the predicted level of RF correlation as a basis to control configuration of air-interface communication between the base station and the given UE according to a modulation and coding scheme (MCS) different than an MCS that the base station associates with a channel quality index (CQI) that the given UE has most recently reported to the base station.

12. A base station comprising:
an antenna structure configured to wirelessly communicate over an air interface with user equipment devices (UEs) served by the base station, wherein the air interface defines various time-frequency resources; and
a controller configured to control transmission over the air interface,
wherein the controller is configured to group together as a multi-user multiple-input-multiple-output (MU-MIMO) group a plurality of UEs served by the base station, wherein the UEs of the MU-MIMO group will engage in air-interface communication with the base station on the same time-frequency resources as each other,
wherein the controller is configured to predict a level of radio-frequency (RF) correlation between a given UE of the MU-MIMO group and one or more other UEs of the MU-MIMO group, and
wherein the controller is configured to use the predicted level of RF correlation as a basis to configure air-interface communication between the base station and the given UE according to a modulation and coding scheme (MCS) different than an MCS that the base station associates with a channel quality index (CQI) that the given UE has most recently reported to the base station.

13. The base station of claim 12, wherein predicting the level of RF correlation between the given UE of the MU-MIMO group and the one or more other UEs of the MU-MIMO group comprises:
computing the level of RF correlation based on angular separation between (i) beam direction for communication between the base station and the given UE of the MU-MIMO group and (ii) respective beam direction for communication between the base station and each of the one or more other UEs of the MU-MIMO group.

14. The base station of claim 13, wherein the controller is configured to determine respectively for each UE of the MU-MIMO group a beam direction for communication between the base station and the UE,
wherein computing the level of RF correlation between the given UE and the one or more other UEs comprises evaluating angular separation between (i) the determined beam direction for communication between the base station and the given UE and (ii) the determined beam direction respectively for communication between the base station and each of the one or more other UEs.

15. The base station of claim 12, wherein predicting the level of RF correlation between the given UE of the MU-MIMO group and the one or more other UEs of the MU-MIMO group comprises:

in a grid that plots ranges of vertical beam angles against ranges of horizontal beam angles, categorizing each UE of the MU-MIMO group into a respective grid location; and
evaluating distance in the grid between the respective grid location of the given UE and the respective grid location of each of the other UEs of the MU-MIMO group.

16. The base station of claim 12, wherein the base station is provisioned with a table that associates CQIs with MCSs, ranging from a lowest CQI associated with a lowest-order MCS to a highest CQI associated with a highest-order MCS,
wherein using the predicted level of RF correlation as a basis to configure air-interface communication between the base station and the given UE according to the MCS different than the MCS that the base station associates with the CQI that the given UE has most recently reported to the base station comprises:
determining from the table a baseline MCS that the table correlates with the CQI that the given UE has most recently reported to the base station,
determining that the predicted level of RF correlation is at least as high as a predefined threshold level,
responsive to the determining that the predicted level of RF correlation is at least as high as the predefined threshold level, selecting from the table the different MCS based on the selected MCS being lower-order than the baseline MCS, and
configuring the air-interface communication between the base station and given UE to use the selected MCS rather than the baseline MCS.

17. The base station of claim 16, wherein configuring the air-interface communication between the base station and given UE to use the selected MCS rather than the baseline MCS comprises causing the base station to transmit to the UE a scheduling directive that schedules the air-interface communication and that specifies use of the selected MCS rather than use of the baseline MCS.

18. The base station of claim 17, wherein the air-interface communication is downlink communication.

19. The method of claim 12, wherein the base station is provisioned with a mapping between various levels of RF correlation and various respective MCS adjustments,
wherein using the predicted level of RF correlation as a basis to configure air-interface communication between the base station and the given UE according to the MCS different than the MCS that the base station associates with the CQI that the given UE has most recently reported to the base station comprises:
using the mapping to determine based on the predicted level of RF correlation a respective MCS adjustment, and
establishing the different MCS by applying the determined MCS adjustment to the MCS that the base station associates with the CQI the given UE has most recently reported to the base station, and
configuring the air-interface communication between the base station and the given UE according to the established different MCS.

20. The base station of claim 12, wherein the time-frequency resources are physical resource blocks.

* * * * *